United States Patent Office 3,407,091
Patented Oct. 22, 1968

3,407,091
METHOD FOR SEALING GLASS TO METAL AND SEAL PRODUCED THEREBY
Robert A. Busdiecker, Woodville, Ohio, assignor to Owens-Illinois, Inc., a corporation of Ohio
No Drawing. Filed June 5, 1964, Ser. No. 373,062
5 Claims. (Cl. 117—129)

The present invention relates to sealing glass to metal surfaces to obtain seals possessing improved chemical durability and a wide and high range of coefficients of thermal expansion. The present invention further relates to glass to metal seals possessing improved properties.

Sealing glasses having a wide range of coefficients of thermal expansion have been employed in the past in the making of seals to various metals. Particularly in the field of electronics, encapsulation of various electrical devices, miniature circuits and the like employing sealing glasses, has required the glass to metal seals to be of high quality and durability. The variety of metals employed in this field such as iron, copper, aluminum and others have a considerably wide range in thermal expansion characteristics. In order to minimize differences in thermal expansion characteristics between metal and glass and obtain a satisfactory seal, it is desirable that the coefficients of thermal expansion of the sealing glass likewise range over wide limits.

Although sealing glasses are known possessing relatively high coefficients of thermal expansion, the chemical durability thereof has not been satisfactory, particularly with those sealing glasses that have coefficients in excess of about $150 \times 10^{-7}/°$ C. Exposure to ambient conditions over periods of time have resulted in weathering and deterioration of the seal.

It is therefore desirable to obtain seals of glass to metal wherein the sealing glasses employed in the making thereof have good chemical durability over a relatively wide range of coefficients of thermal expansion, and particularly in the area of high coefficients of thermal expansion.

Accordingly, it is an object of the present invention to seal glass to metal employing sealing glasses having a relatively high coefficient of expansion and avoid the disadvantages and shortcomings of the past.

It is a further object of the present invention to improve the chemical durability of glass to metal seals employing sealing glasses possessing a relatively high coefficient of thermal expansion.

It is a further object of the present invention to provide a method for sealing glass to metal using sealing glasses of a high coefficient of thermal expansion and improved chemical durability.

It is a further object of the present invention to provide glass to metal seals and sealed articles that avoid the shortcomings and disadvantages encountered in the past.

In attaining the above objects, one feature of the present invention resides in forming a glass to metal seal employing a phosphate glass-forming system possessing a wide range of coefficients of thermal expansion and improved chemical durability.

Another feature of the present invention resides in glass to metal seals where the metal is one having a relatively high coefficient of thermal expansion such as copper or aluminum.

Other objects, features and advantages of the present invention will become apparent from the following detailed description thereof.

According to the present invention, glass to metal seals are provided by employing a phosphate glass-forming composition containing $P_2O_5$, $Al_2O_3$, ZnO and an alkali metal oxide selected from the group consisting of $Na_2O$, $K_2O$ and mixtures thereof.

The sealing glasses of the present invention are characterized by having a wide range of coefficients of thermal expansion to thereby minimize the difference between the expansion characteristics of the metal and the glass and thus avoid separation of the seal.

The vitreous sealing glasses employed according to the present invention consists essentially of from about 2% to 10% by weight $Al_2O_3$, 4% to 27% $K_2O$, 4% to 30% ZnO and 60% to 67% $P_2O_5$. $Na_2O$ may be used in place of the $K_2O$, or mixtures of $Na_2O$ and $K_2O$ can be employed. This system produces glasses which have a wide range of coefficients of thermal expansion ranging from approximately $80 \times 10^{-7}/°$ C. to $255 \times 10^{-7}/°$ C. (0–300° C.). This wide range of high coefficients of thermal expansion makes the sealing glasses particularly suitable for seals to be made to metals with relatively high coefficients of thermal expansion ($\alpha$) such as iron with an $\alpha$ value of $135 \times 10^{-7}/°$ C., copper with an $\alpha$ value of $175 \times 10^{-7}/°$ C. as well as aluminum with an $\alpha$ value of $240 \times 10^{-7}/°$ C.

All percentages referred to herein are by weight, and the ranges of compositions referred to are inclusive of the end figures quoted for each constituent.

Of course, in addition to the components specified in the various compositions, the glasses may in certain cases contain trace impurities derived from impurities in raw materials used in the manufacture of the glass.

In the compositions set forth herein, the various components are expressed in terms of their oxides and it will be understood that in preparing the sealing glasses the components may be added in various forms. For obtaining compositions as defined herein it may be necessary to take into account losses due to volatilization and the like and hence the composition of the starting batch can be adjusted accordingly.

For the manufacture of a sealing glass according to the present invention, the batch can be prepared from the various ingredients commonly used in the art for providing the constituent oxides in their required amounts.

In carrying out the present invention, the seal is formed by applying the sealing glass to the metal surface that is preferably heated to a high temperature in order to avoid chilling the sealing glass. Generally, it is advantageous to prepare the surface of the metal for the sealing operation although in certain instances it may not be necessary. Surface preparation can be accomplished by any one of several known methods. For example, the metal surface can be "borated" according to the treatment described in Partridge, J. S., Glass to Metal Seals, The Society of Glass Technology, Sheffield, England, 1949. The surface can also be prepared by grinding with an abrasive material, e.g., 60 mesh Carborundum. In making copper seals, it has been found that the preferred form of copper is oxygen free, high conductivity copper.

The sealing glass can be applied in the molten condition and is flowed onto the surface of the hot metal. Other methods can also be used including forming a frit of the glass and applying the frit either as a dry powder or in the form of a slurry or paste made by employing a suitable vehicle; e.g., acetone. When it is desired to form a laminated product, the second metal surface may then be brought into contact with the glass and the structure held together to form the bond. Any suitable source of heat can be employed in order to make the seals according to the present invention including the usual ovens and furnaces, infrared, flame sealing and the like. It is normally preferred to make the seals in an oven or furnace because temperature control is facilitated. Stresses that may result in the seal are reduced and relieved by placing the sealed article in an annealing furnace and heating to the annealing temperature for an appropriate period of time varying from several minutes to several hours. The annealing temperature can vary over a considerable range depending upon composition and it has been found that 15 minutes at about 350° C. to about 500° C. are suitable conditions.

In commercial operations involving bonding several metal surfaces, as for example in preparing aluminum wafers for the electronics industry, the sealing glass is prepared in the form of beads which are placed on the surface to be sealed. The assembly is placed in a furnace and heated to a sufficiently high temperature to cause the glass to melt and flow in an even coating over the metal surfaces. Thereafter the assembly can be sent through an annealing oven to reduce stresses if necessary as explained above.

The following examples serve to illustrate the present invention but are not considered limiting thereof. In each instance all parts and percentages are by weight.

EXAMPLE I

A sealing glass of the following composition was prepared:

| | Percent |
|---|---|
| $Al_2O_3$ | 2.4 |
| $K_2O$ | 24.8 |
| $ZnO$ | 9.1 |
| $P_2O_5$ | 63.7 |

The glass was cast into a sample ⅜″ x 3″ x 1″ and annealed to approximately 450° C. The coefficient of thermal expansion was measured and the value was indicated as $220.3 \times 10^{-7}/°$ C., from 0 to 300° C. A butt weld was prepared by sealing the above glass composition to aluminum ($\alpha = 240 \times 10^{-7}/°$ C.). The sample was then subjected to testing and upon breaking the fracture was observed to occur in the glass and not at the glass-aluminum interface thus indicating that an excellent seal was made.

EXAMPLE II

A sealing glass of the following composition was prepared:

| | Percent |
|---|---|
| $Al_2O_3$ | 3.30 |
| $K_2O$ | 4.56 |
| $ZnO$ | 29.92 |
| $P_2O_5$ | 62.22 |

Expressed in terms of a ternary system:

| | Percent |
|---|---|
| $Al_2O_3 \cdot 2P_2O_5$ | 12.5 |
| $ZnO \cdot P_2O_5$ | 75.0 |
| $K_2O \cdot P_2O_5$ | 12.5 |

The annealing point for this glass was 380° C. The coefficient of thermal expansion was measured as $101.4 \times 10^{-7}/°$ C. (0–300° C.).

The above-identified sealing glass was tested by preparing a butt seal with iron having a coefficient of thermal expansion of $135 \times 10^{-7}/°$ C. The resulting butt seal was found to have good properties. After being exposed to ambient conditions for over 16 months the appearance of the seal showed good resistance to weathering.

EXAMPLE III

A sealing glass of the following was prepared:

| | | |
|---|---|---|
| $Al_2O_3$ | percent | 9.91 |
| $K_2O$ | do | 4.56 |
| $ZnO$ | do | 19.95 |
| $P_2O_5$ | do | 65.58 |
| Liquidus temperature | ° C. | 970 |
| Coefficient of thermal expansion | | $80 \times 10^{-7}/°$ C. (0–300° C.) |
| Annealing point | ° C. | 474 |

This sealing was observed after over 16 months' exposure to ambient conditions and found to have good resistance to weathering.

EXAMPLE IV

A sealing glass of the following composition was prepared:

| | Percent |
|---|---|
| $Al_2O_3$ | 9.91 |
| $K_2O$ | 18.22 |
| $ZnO$ | 4.99 |
| $P_2O_5$ | 66.88 |

The liquidus temperature was 857° C. The annealing point was found to be 411° C. and the coefficient of thermal expansion was measured as $141 \times 10^{-7}/°$ C. (0–300° C.).

This sealing glass was employed for making a glass to copper seal. The copper employed was the oxygen free, high conductivity type and had a coefficient of $175 \times 10^{-7}/°$ C. The resulting seal was highly successful and had good resistance to weathering after exposure to ambient conditions for over 16 months.

EXAMPLE V

A sealing composition of the following was prepared:

| | Percent |
|---|---|
| $Al_2O_3$ | 6.61 |
| $K_2O$ | 13.67 |
| $ZnO$ | 14.96 |
| $P_2O_5$ | 64.76 |

The liquidus temperature was found to be 800° C. The annealing point was 392° C. and the coefficient of thermal expansion was calculated as $127 \times 10^{-7}/°$ C. (0–300° C.). This sealing glass was observed to have resistance to weathering after exposure to ambient conditions for over 16 months.

As is seen from the foregoing examples, the thermal expansion characteristics of the sealing glasses of the present invention vary over a considerably wide range. Because these glasses of relatively high coefficients of thermal expansion have improved weathering characteristics and good chemical durability they are particularly suitable for sealing to metals of the high expansion type, although of course they can be employed with other metals as well. It is to be understood that the term "metal" includes alloys as well.

The above examples are illustrative and do not restrict the present invention. Moreover, the present invention may be susceptible of embodiment in other modified form, all of which come equally within the scope and spirit of the claims appended hereto.

I claim:

1. In a method for sealing glass to metal wherein previously employed sealing glasses having a relatively wide and high range of coefficients of thermal expansion are characterized by poor chemical durability, the improvement whereby seals are obtained having a relatively high coefficient of thermal expansion and possess good chemical durability comprising sealing the metal with a sealing glass composition consisting essentially of, in percent by weight:

| | Percent |
|---|---|
| $Al_2O_3$ | 2–10 |
| Alkali metal oxide | 4–27 |
| $ZnO$ | 4–30 |
| $P_2O_5$ | 60–67 | wherein the alkali metal oxide is selected from the group consisting of $Na_2O$, $K_2O$ and mixtures thereof, and thereafter annealing the glass of the resulting seal by subjecting the glass-to-metal seal to an annealing temperature in the range of about 350° C. to about 500° C.

2. In the method as defined in claim 1 wherein the sealing glass composition consists essentially of in percent by weight:

| | Percent |
|---|---|
| $Al_2O_3$ | 2.4 |
| $K_2O$ | 24.8 |
| $ZnO$ | 9.1 |
| $P_2O_5$ | 63.7 |

3. In the method of claim 1 wherein the sealing glass composition consists essentially of in percent by weight:

| | Percent |
|---|---|
| $Al_2O_3$ | 3.30 |
| $K_2O$ | 4.56 |
| $ZnO$ | 29.92 |
| $P_2O_5$ | 62.22 |

4. In the method of claim 1 wherein the sealing glass composition consists essentially of in percent by weight:

| | Percent |
|---|---|
| $Al_2O_3$ | 9.91 |
| $K_2O$ | 18.22 |
| $ZnO$ | 4.99 |
| $P_2O_5$ | 66.88 |

5. A laminated metal product having two metal surfaces sealed together with a glass consisting essentially of, in percent by weight:

| | Percent |
|---|---|
| $Al_2O_3$ | 2–10 |
| Alkali metal oxide | 4–27 |
| $ZnO$ | 4–30 |
| $P_2O_5$ | 60–67 | wherein the alkali metal oxide is selected from the group consisting of $Na_2O$, $K_2O$ and mixtures thereof.

References Cited
UNITED STATES PATENTS

| 2,147,418 | 2/1939 | Bahls | 65—59 XR |
| 2,441,853 | 5/1948 | Stanworth | 106—47 |
| 3,020,238 | 2/1962 | Munakata et al. | 106—47 XR |
| 3,253,934 | 5/1966 | Godron | 117—29 X |

DONALL H. SYLVESTER, *Primary Examiner.*

R. L. LINDSAY, *Assistant Examiner.*